(12) United States Patent
Yamamura

(10) Patent No.: US 9,888,625 B2
(45) Date of Patent: Feb. 13, 2018

(54) CONTROL APPARATUS FOR AUTONOMOUSLY NAVIGATING UTILITY VEHICLE

(71) Applicant: Honda Motor Co., Ltd., Tokyo (JP)

(72) Inventor: Makoto Yamamura, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 107 days.

(21) Appl. No.: 15/016,156

(22) Filed: Feb. 4, 2016

(65) Prior Publication Data

US 2016/0227704 A1    Aug. 11, 2016

(30) Foreign Application Priority Data

Feb. 10, 2015   (JP) .................................. 2015-024537

(51) Int. Cl.
*G05D 1/02*    (2006.01)
*A01D 34/00*   (2006.01)
*A01D 101/00*  (2006.01)

(52) U.S. Cl.
CPC ......... *A01D 34/008* (2013.01); *G05D 1/0265* (2013.01); *A01D 2101/00* (2013.01); *G05D 2201/0208* (2013.01)

(58) Field of Classification Search
None
See application file for complete search history.

(56) References Cited

U.S. PATENT DOCUMENTS

| 6,255,793 | B1* | 7/2001 | Peless | A01D 34/008 180/168 |
| 8,938,318 | B2* | 1/2015 | Bergstrom | A01D 34/008 356/614 |
| 9,405,294 | B2* | 8/2016 | Jagenstedt | A01D 34/008 |
| 2016/0113195 | A1* | 4/2016 | Das | A01D 34/008 701/25 |

FOREIGN PATENT DOCUMENTS

| EP | 2437131 A1 | 4/2012 |
| EP | 2667271 A1 | 11/2013 |
| JP | 2012079022 A | 4/2012 |

* cited by examiner

*Primary Examiner* — Adam D Tissot
(74) *Attorney, Agent, or Firm* — Duft Bornsen & Fettig LLP

(57) ABSTRACT

In an apparatus for controlling operation of an autonomously navigating utility vehicle travelling about a working area delineated by a boundary wire, there are provided with a pair of magnetic sensors, a turning angle detector, a travel distance detector, a travel controlling unit controlling the vehicle to travel along the boundary wire based on the magnetic field strength detected by one of the magnetic sensors while positioning other of the magnetic sensors inside the boundary wire, a route generating unit generating a travel route along a boundary of the working area based on the turning angle and the travel distance, a memory unit memorizing the magnetic field strengths detected by the other of the magnetic sensor in association with the travel route, and a position identifying unit identifying a position of the vehicle by comparing the detected magnetic field strengths with the memorized magnetic field strengths.

16 Claims, 6 Drawing Sheets

CONTROL APPARATUS FOR AUTONOMOUSLY NAVIGATING UTILITY VEHICLE

CROSS-REFERENCE TO RELATED APPLICATION

This application is based upon and claims the benefit of priority from Japanese Patent Application No. 2015-024537 filed on Feb. 10, 2015, the contents of which are incorporated herein by reference.

BACKGROUND OF THE INVENTION

Field of the Invention

This invention relates to a control apparatus for an autonomously navigating utility vehicle that autonomously navigates and performs lawn mowing and/or other work in a working area delineated by a boundary wire.

Description of Related Art

Among conventional control apparatuses for such an autonomously navigating utility vehicle are known ones that make the utility vehicle travel along the boundary wire while using magnetic sensors to detect magnetic field strength (intensity) generated by electric current passing through the boundary wire and detect moving direction displacement and travel distance of the utility vehicle at this time using an angular velocity sensor and a wheel speed sensor, respectively, so as to generate on a bitmap a travel route representing a boundary (boundary line) of an area to be traveled (working area) (see Japanese Laid-Open Patent Application No. 2012-79022 (JP 2012-79022A), for example).

After generating the travel route representing the boundary of the area to be traveled, the control apparatus of the reference identifies or determines the position of the utility vehicle on the bitmap based on values detected by the angular velocity sensor and the wheel speed sensor. The control apparatus described in the reference is also equipped with a geomagnetic field sensor and calibrates the output of the angular velocity sensor based on the output of the geomagnetic field sensor during straight travel work in a predetermined direction.

However, the control apparatus of the reference may not be able to identify or detect the position (self-position) of the utility vehicle accurately because it identifies the position of the utility vehicle based on values detected by the angular velocity sensor and wheel speed sensor. Moreover, the control apparatus of the reference ensures positional accuracy during straight travel of the utility vehicle by using the output of the geomagnetic field sensor to calibrate the output of the angular velocity sensor. Disadvantageously, a geomagnetic field sensor or other such position detecting sensor is generally costly, so that a configuration equipped with a geomagnetic field sensor increases the cost of the control apparatus as a whole.

SUMMARY OF THE INVENTION

According to an aspect of the present invention, there is provided an apparatus for controlling operation of an autonomously navigating turnable utility vehicle equipped with a body and a prime mover mounted on the body to make the vehicle travel about a working area delineated by a boundary wire in order to work autonomously in work mode, comprising: a pair of magnetic sensors installed spaced apart from each other in a lateral direction of the body on the body of the vehicle, each of the pair of magnetic sensors detecting (producing an output indicating) a magnetic field strength generated by electric current passing through the boundary wire; a turning angle detector configured to detect (produce an output indicating) a turning angle of the vehicle; a travel distance detector configured to detect (produce an output indicating) a travel distance of the vehicle; a travel controlling unit configured to control the prime mover to make the vehicle travel along the boundary wire in trace mode to be executed before the work mode, based on the magnetic field strength detected by one of the magnetic sensors while positioning other of the magnetic sensors inside the boundary wire; a route generating unit configured to generate a travel route along a boundary of the working area, based on the turning angle detected by the turning angle detector and the travel distance detected by the travel distance detector in the trace mode; a memory unit configured to memorize the magnetic field strengths detected by the other of the magnetic sensor in the trace mode in association with the travel route; and a position identifying unit configured to identify a position of the vehicle in the work mode by comparing the magnetic field strengths detected by the pair of magnetic sensors with the magnetic field strengths memorized in the memory unit.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
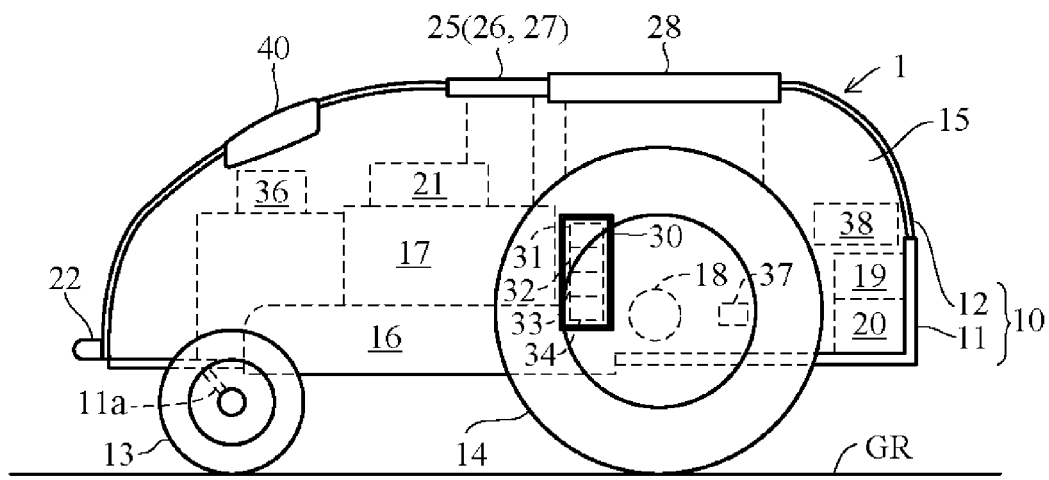
FIG. 1 is a side view schematically illustrating configuration of an autonomously navigating utility vehicle according to an embodiment of this invention.

An embodiment of the present invention is explained with reference to FIGS. 1 to 11 in the following. FIG. 1 is a side view schematically illustrating the configuration of an autonomously navigating utility vehicle according to an embodiment of the present invention, and FIG. 2 is plan view of the same.

The autonomously navigating utility vehicle of the present invention can be embodied in the form of various types of utility vehicle and particularly as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

Figure 2:
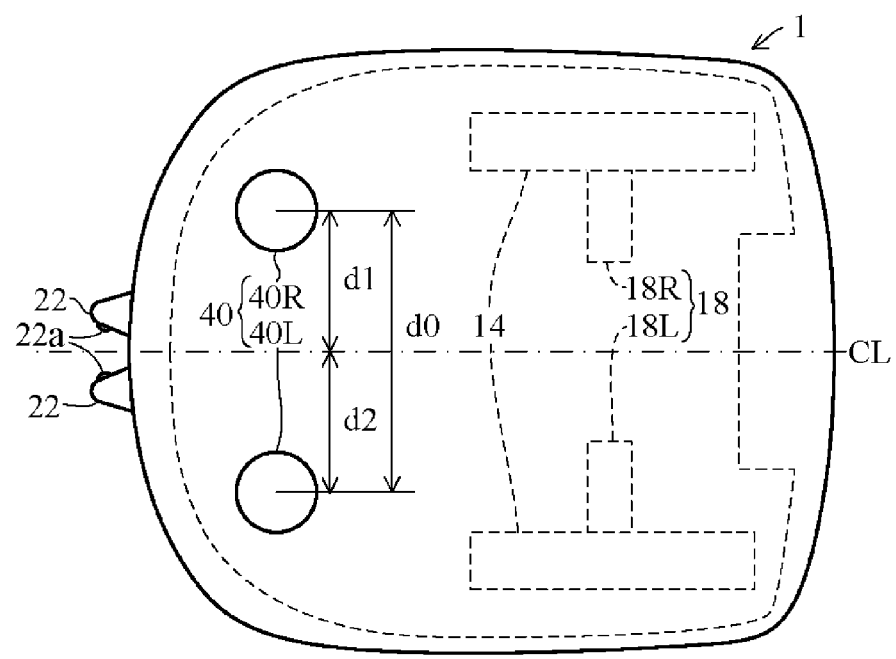
FIG. 2 is a plan view schematically illustrating the configuration of the utility vehicle according to the embodiment.

As shown in FIGS. 1 and 2, an autonomously navigating utility vehicle (hereinafter called simply "vehicle") 1 is equipped with a body 10 having a chassis 11 and a frame 12, along with a pair of left and right front wheels 13 and a pair of left and right rear wheels 14 that support the body 10 above a ground surface GR so as to be capable of travel.

The front wheels 13 are rotatably fastened through stays 11a to the front side of the chassis 11. The rear wheels 14, which are greater in diameter than the front wheels 13, are rotatably fastened directly to the rear end of the chassis 11. The weight and size of the vehicle 1 are such that it can be transported by an operator. As an example can be cited a vehicle 1 whose total length (forward-rearward direction length) is about 500 mm, total width about 300 mm, and height about 300 mm.

A work unit 16, a work motor 17 for driving the work unit 16, travel motors (prime mover) 18 for driving the rear wheels 14, a battery charging unit 19, a battery 20 and a housing box 30 are deployed in an internal space 15 of the vehicle 1 enclosed by the chassis 11 and the frame 12.

The work unit 16 comprises a rotor and blades attached to the rotor and has a substantially disk-like shape as a whole. A rotating shaft is installed vertically at the center of the rotor and the work unit 16 is configured to enable adjustment of the height of the blades above the ground GR through a height regulating mechanism 21 by the operator. The height regulating mechanism 21 is equipped with, for example, a screw operable by the operator. The work motor 17 is constituted by an electric motor installed above the work unit 16, and an output shaft thereof is connected to the rotating shaft of the rotor to rotate the blades unitarily with the rotor.

The travel motors 18 comprise a pair of electric motors 18L and 18R installed on the right and left inner sides of the left and right rear wheels 14. Output shafts of the travel motors 18L and 18R are connected to rotating shafts of the left and right rear wheels 14, respectively, so as each to independently drive or rotate the left or right rear wheel 14. In other words, the vehicle 1 comprises the front wheels 13 as non-driven free wheels and the rear wheels 14 as driving wheels, and the travel motors 18L and 18R each independently rotates one of the rear wheels 14 normally (rotation to move forward) or reversely (rotation to move reverse). By establishing a difference between the rotating speeds of the left and right rear wheels 14, the vehicle 1 can be turned to an arbitrary direction.

For example, when the left and right rear wheels 14 are both rotated normally and the rotational speed of the right rear wheel 14 is greater than the rotational speed of the left rear wheel 14, the vehicle 1 turns left at a turning angle θ in accordance with the speed difference. Conversely, when the rotational speed of the left rear wheel 14 is greater than the rotational speed of the right rear wheel 14, the vehicle 1 turns right at a turning angle θ in accordance with the speed difference. When one of the left and right rear wheels 14 is rotated normally and the other reversely both at the same speed, the vehicle 1 turns on the spot.

The battery charging unit 19, which includes an AC-DC converter, is connected by wires to charging terminals 22 provided at the front end of the frame 12 and is also connected by wires to the battery 20. The charging terminals 22 have contacts 22a, and the battery 20 can be charged by connecting the charging terminals 22 through the contacts 22a to a charging station 3 (see FIG. 3). The battery 20 is connected through wires to the work motor 17 and the travel motors 18, and the work motor 17 and the travel motors 18 are driven by power supplied from the battery 20. The voltage of the battery 20 is detected by a voltage sensor (not shown).

The housing box 30 is installed near the middle of the vehicle 1. A printed circuit board 30a (see FIG. 5) deployed inside the housing box 30 has an Electronic Control Unit (ECU) 31, an angular velocity sensor (turning angle sensor) 32, an acceleration sensor 33, and a temperature sensor 34 implemented thereon.

The ECU 31 has a microcomputer of a configuration including an arithmetic processing unit (CPU) and memories ROM, RAM and other peripheral circuits. The angular velocity sensor 32 produces an outputs indicating angular velocity occurring around a height direction (z-axis) of the vehicle 1. The turning angle θ of the vehicle 1 around the z-axis can be calculated using the generated output of the angular velocity sensor 32. The acceleration sensor 33 produces an output indicating acceleration acting on the vehicle 1 in the directions of three orthogonal axes (x-axis, y-axis, and z-axis).

The vehicle 1 is additionally equipped with a contact sensor 36, a pair of wheel speed sensors (travel distance detector) 37, a lift sensor 38, operation switches 25, a display 28, and magnetic sensors 40.

The contact sensor 36 produces an output of ON signal when the frame 12 is detached from the chassis 11 owing to contact with an obstacle or the like. Each of the pair of wheel speed sensors 37 produces an outputs indicating wheel speed of one of the left and right rear wheels 14. The produced outputs of the wheel speed sensors 37 can be used to calculate the travel distance of the vehicle 1. The lift sensor 38 produces an output of ON signal when the frame 12 is lifted off the chassis 11. The operation switches 25 provided to be manipulated by the operator, include a main switch 26 for commanding, inter alia, start of vehicle 1 operation, and an emergency stop switch 27 for stopping the vehicle 1 in an emergency. The display 28 shows various information to be supplied to the operator.

In the present embodiment, the two magnetic sensors 40 (magnetic sensors 40R and 40L) are installed laterally spaced apart on the front side of the vehicle 1. More specifically, as shown in FIG. 2, the two magnetic sensors 40R and 40L are installed laterally symmetrically with respect to a center line CL running in the straight forward direction along the widthwise center of the vehicle 1. Therefore, where the distance between the magnetic sensors 40R and 40L is defined as d0, the distances d1 and d2 of the magnetic sensors 40R and 40L from the center line CL are both d0/2 and thus equal. Each of the magnetic sensors 40 produces an output indicating magnetic field strength H. Owing to their identical configuration, the outputs of the magnetic sensors 40R and 40L become identical to each other when exposed to the same magnetic field.

Figure 3:
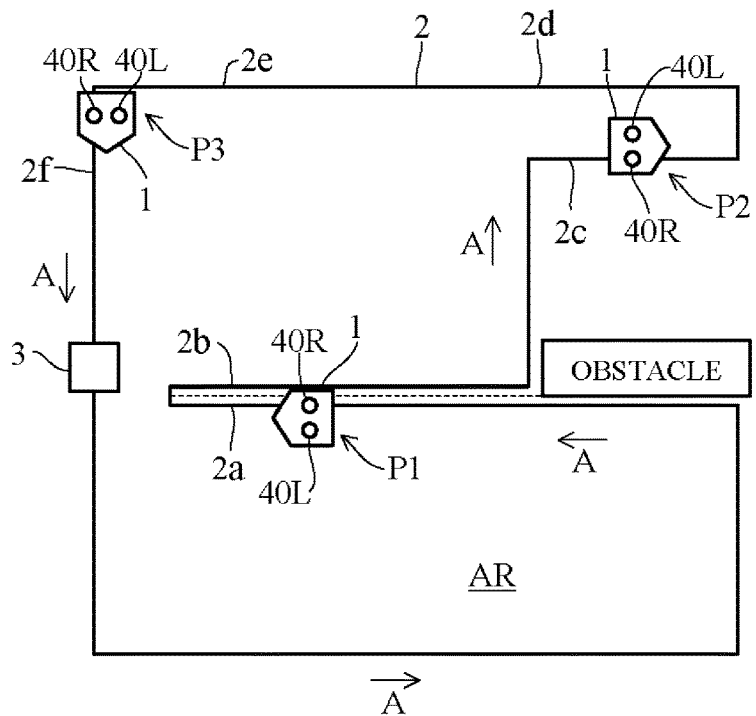
FIG. 3 is a diagram showing an example of a working area to be serviced by the utility vehicle according to the embodiment.

The utility vehicle 1 configured as set out above autonomously navigates within a predefined working area. FIG. 3 shows an example of a working area AR. The working area AR is delineated by a boundary wire 2 laid beforehand (e.g., buried a predetermined depth under the ground surface GR). A magnetic field is generated in the working area AR by passing electric current through the boundary wire 2. The charging station 3 for charging the battery 20 is situated above the boundary wire 2. The working area AR defines the travel range of the vehicle 1 and may include not only area(s) to be serviced but also area(s) not to be serviced.

Figure 4:
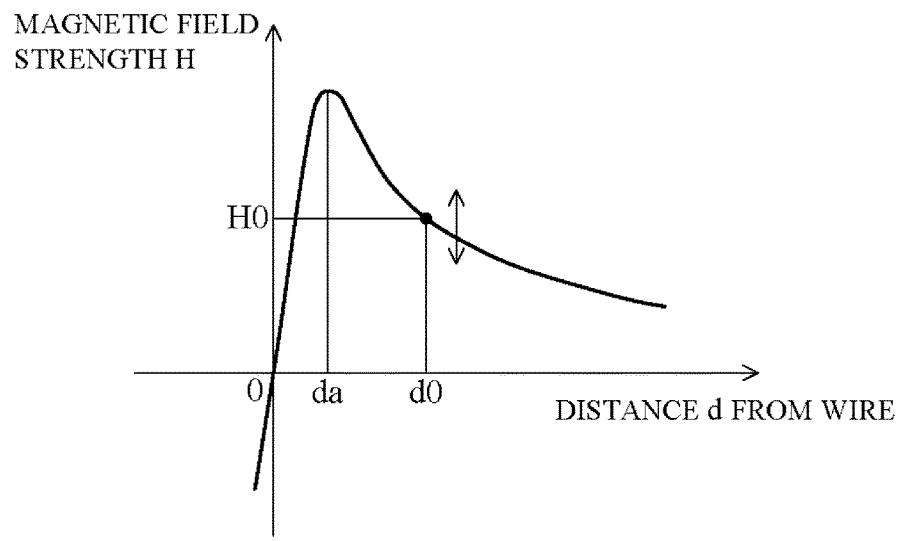
FIG. 4 is a diagram showing a relationship between distance from a boundary wire and magnetic field strength.

FIG. 4 shows a relationship between distance d from the boundary wire 2 and magnetic field strength H. As indicated in FIG. 4, magnetic field strength H varies with distance d from the boundary wire 2. Specifically, magnetic field strength H is zero above the boundary wire, positive inside the working area AR, and negative outside the same. Inside the working area AR, the magnetic field strength H rises to the right with increasing distance d from the boundary wire 2 and thereafter falls to the right. The range of the rise to the right (0≤d≤da) is shorter than the distance d0 between the magnetic sensors 40R and 40L.

In the present embodiment, the vehicle 1 operates in or during work mode and trace mode in response to control commands sent from the ECU 31 in accordance with programs prepared beforehand and memorized in the memory (ROM). In work mode, the vehicle 1 works (mows lawn or grass) while autonomously navigating in the working area AR. In trace mode, the vehicle 1 is driven along the boundary wire 2. Trace mode is executed before work mode to demarcate the working area AR.

More specifically, as shown in FIG. 3, in trace mode the ECU 31 controls operation of the travel motors 18 to make the vehicle 1 circuit or travel along the boundary wire 2 with one of the pair of magnetic sensors 40R and 40L (e.g., 40L) positioned inside the boundary wire 2 and so that the other magnetic sensor (e.g., 40R) follows the boundary wire 2 in the direction of arrow A. Specifically, the ECU 31 monitors the output of the magnetic sensor 40R and controls operation of the travel motors 18 so that the magnetic field strength H detected by the magnetic sensor 40R stays at zero. In this case, the magnetic field strength H detected by the other magnetic sensor 40L becomes a plus value H0 corresponding to distance d0 from the boundary wire 2, as shown in FIG. 4.

For example, the ECU 31 turns the vehicle 1 rightward when the magnetic field strength H detected from the output of the magnetic sensor 40R becomes positive and turns the vehicle 1 leftward when the magnetic field strength H becomes negative, thereby implementing control to keep the magnetic sensor 40R near the boundary wire 2 and maintain the magnetic field strength H detected from the output of the magnetic sensor 40R at zero. In this case, the magnetic field strength H detected from the output of the other magnetic sensor 40L becomes a plus value H0 corresponding to distance d0 from the boundary wire 2, as shown in FIG. 4.

Of note in this connection is that the boundary wire 2 is laid with bends and includes some regions with distinctive features. As shown in FIG. 3, these include, for example, an exterior-wrapping section P1 detouring an obstacle, an interior-wrapping section P2 defining a narrow working area AR, an interior-wrapping corner section P3, and the like. In FIG. 3, sections of the boundary wire 2 constituting the exterior-wrapping section P1, interior-wrapping section P2 and corner section P3 are defined as wire segments 2a to 2f.

In the exterior-wrapping section P1, the direction of the magnetic field generated by the wire segment 2a and the direction of the magnetic field generated by the wire segment 2b facing it are mutually opposite. As a result, the magnetic field generated by the wire segment 2a is partially canceled by the magnetic field generated by the wire segment 2b, so that the magnetic field strength detected from the output of the magnetic sensor 40L becomes smaller. On the other hand, in the interior-wrapping section P2, the direction of the magnetic field generated by the wire segment 2c and the direction of the magnetic field generated by the wire segment 2d facing it are mutually the same. As a result, the magnetic field generated by the wire segment 2c is reinforced by the magnetic field generated by the wire segment 2d, so that the magnetic field strength detected from the output of the magnetic sensor 40L becomes larger. The same is true at the interior-wrapping corner section P3, so that the magnetic field strength detected from the output of the magnetic sensor 40L becomes larger.

Thus the magnetic field strength detected from the output of the magnetic sensor 40L in trace mode varies with the layout of the boundary wire 2 in the vicinity of the vehicle 1 notwithstanding that the distance from the boundary wire 2 is constant (=d0). Namely, the magnetic field strength H0 at distance d0 in FIG. 4 is affected by multiple wire segments 2a to 2f around the vehicle 1 and increases or decreases in accordance with the position of the vehicle 1 on the boundary wire 2. Taking this point into account, the present embodiment is configured to memorize or store the magnetic field strengths H detected from the output of the magnetic sensor 40L in trace mode, whereby the position of the vehicle 1 in work mode is determined as set out below.

Figure 5:
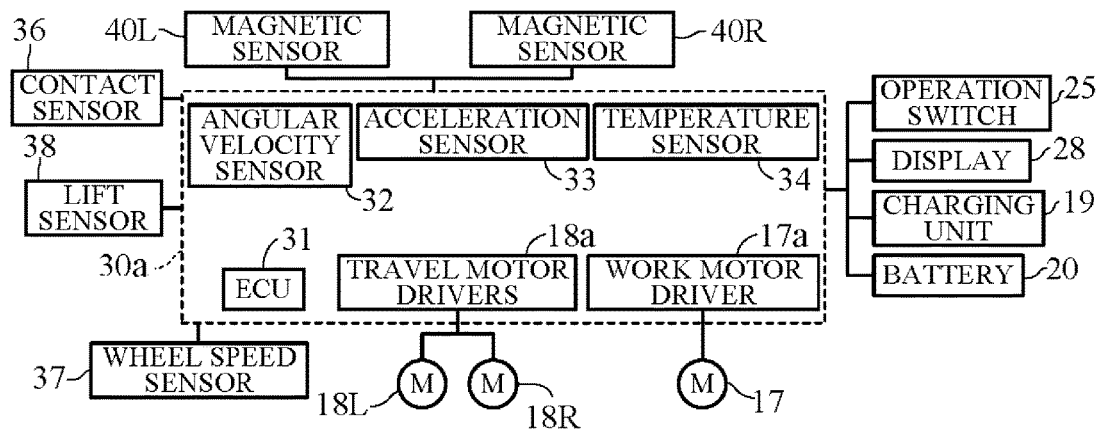
FIG. 5 is a block diagram showing configuration of a control apparatus for the utility vehicle according to the embodiment.

FIG. 5 is a block diagram showing the configuration of the control apparatus of the vehicle 1. As shown in FIG. 5, the printed circuit board 30a has the ECU 31, angular velocity sensor 32, acceleration sensor 33, temperature sensor 34, work motor driver 17a, and travel motor drivers 18a implemented thereon. In addition, the contact sensor 36, wheel speed sensors 37, lift sensor 38, pair of magnetic sensors 40R and 40L, operation switches 25, display 28, battery charging unit 19, battery 20, work motor 17, and pair of travel motors 18L and 18R are connected to the printed circuit board 30a.

The outputs produced from the angular velocity sensor 32, acceleration sensor 33, temperature sensor 34, contact sensor 36, wheel speed sensors 37, lift sensor 38, magnetic sensors 40L and 40R, and operation switches 25 are inputted to the ECU 31. The ECU 31 performs predetermined processing based on these sensor outputs, and outputs control commands to the work motor 17 through the work motor driver 17a and to the travel motors 18L and 18R through the travel motor drivers 18a.

Figure 6:
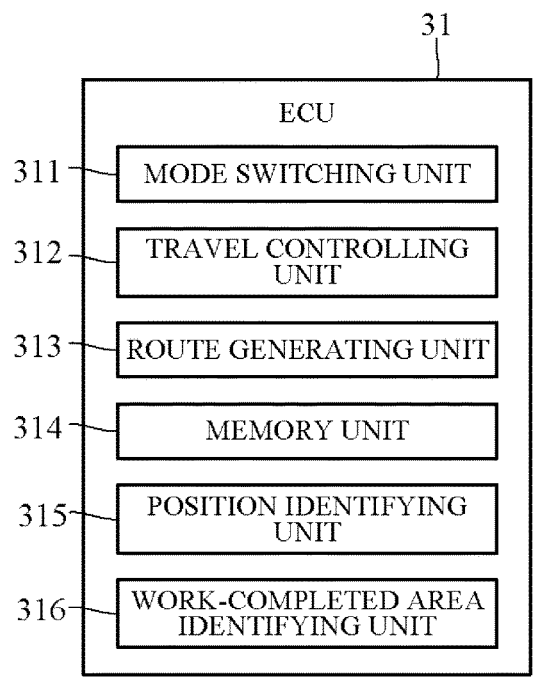
FIG. 6 is a block diagram showing functional configuration of an ECU shown in FIG. 5.

FIG. 6 is a block diagram showing the functional configuration of the ECU 31. The ECU 31 has a mode switching unit 311, a travel controlling unit 312, a route generating unit 313, a memory unit 314, a position identifying unit 315, and a work-completed area identifying unit 316.

The mode switching unit 311 switches between work mode and trace mode. Immediately after the vehicle 1 is started by being turned ON the pertinent operation switch 25 (the main switch 26) by the operator, the mode switching unit 311 switches to trace mode to make the vehicle 1 travel along the boundary wire 2 (trace-driving). When predetermined processing in trace mode is completed, the mode switching unit 311 switches from trace mode to work mode to make the vehicle 1 autonomously navigate and perform work within the working area AR. When the voltage of the battery 20 detected from the output of the voltage sensor falls to or below a predetermined value, work mode is switched to trace mode and the utility vehicle 1 is returned to the charging station 3 by trace-driving.

In trace mode, the travel controlling unit 312 keeps one of the magnetic sensors (e.g., 40L) positioned inside the boundary wire 2 and concomitantly controls the travel motors 18L and 18R based on the output of the other magnetic sensor (e.g., 40R). More specifically, the travel controlling unit 312 controls the vehicle 1 to turn in response to the output of the magnetic sensor 40R so that the magnetic field strength H detected from the output of the magnetic sensor 40R stays at zero. Therefore, as shown in FIG. 3, the magnetic sensor 40R moves along the boundary wire 2 when the vehicle 1 circuits the boundary wire 2.

The route generating unit 313 uses turning angle θ and travel distance L of the vehicle 1 detected in trace mode to generate a travel route PA along a boundary of the working area AR delineated by the boundary wire 2. The route generating unit 313 acquires the turning angle θ by time-integrating the angular velocity detected from the output of the angular velocity sensor 32. The route generating unit 313 acquires the travel distance L by time-integrating the wheel speeds detected from the output of the wheel speed sensors 37. When the outputs of the left and right wheel speed sensors 37 differ, the travel distance L is calculated using the averaged value thereof.

Figure 7:
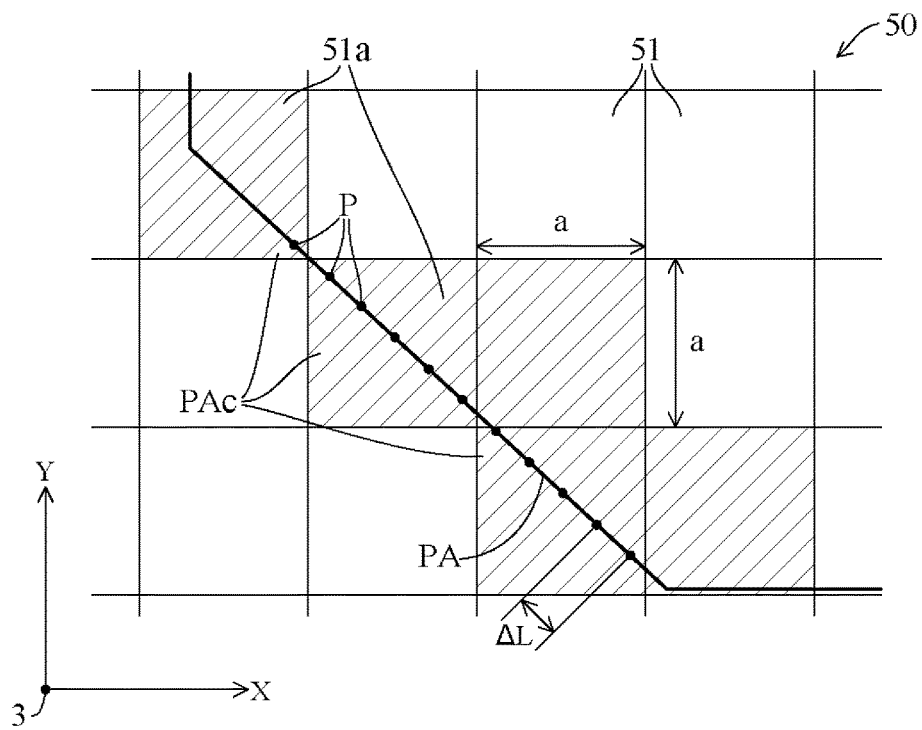
FIG. 7 is a diagram explaining generation procedure of a travel route by a route generating unit shown in FIG. 6.

In the present embodiment, the route generating unit 313 generates the travel route PA (PAc) on a bitmap (as will be explained with reference FIG. 8) composed of an array of cells. FIG. 7 is a diagram explaining the travel route PAc generation procedure. As shown in FIG. 7, the route generating unit 313 forms the bitmap 50 by arraying square cells 51 of predetermined side length a (e.g., 200 mm) in the form of a lattice in a horizontal plane (XY plane) containing an X-axis and a Y-axis. The individual cells 51 include position data defined with respect to a predetermined position (e.g., the charging station 3). The size of the cells 51 can be changed as appropriate and can be defined to coincide with the working width of the work unit 16 (maximum outer diameter of blade).

In generating the travel route PAc, the route generating unit 313 first detects the turning angle Δθ of the vehicle 1 relative to a reference line (e.g., X-axis) every predetermined time interval Δt (e.g., 100 ms) based on the output from the angular velocity sensor 32 and further detects the travel distance ΔL traveled by the vehicle 1 during predetermined time interval Δt based on the outputs of the wheel speed sensors 37.

Next, the route generating unit 313 uses the detected turning angle Δθ and travel distance ΔL in the equations (I) below to calculate the XY-plane position coordinates (X, Y) of moving point P of the vehicle 1 relative to a reference position (e.g., position of the charging station 3) at every predetermined time interval Δt.

$$X=\Delta L \times \cos \Delta\theta, Y=\Delta L \times \sin \Delta\theta \quad (1)$$

As shown in FIG. 7, the travel route PA is obtained by sequentially connecting the calculated moving points P by straight lines. Cells 51a (hatched regions) containing the travel route PA constitute the travel route PAc on the bitmap 50. The travel route PAc is thus generated on the bitmap 50 in cell units. The travel route PA (PAc) becomes the boundary of the working area AR.

Figure 8:
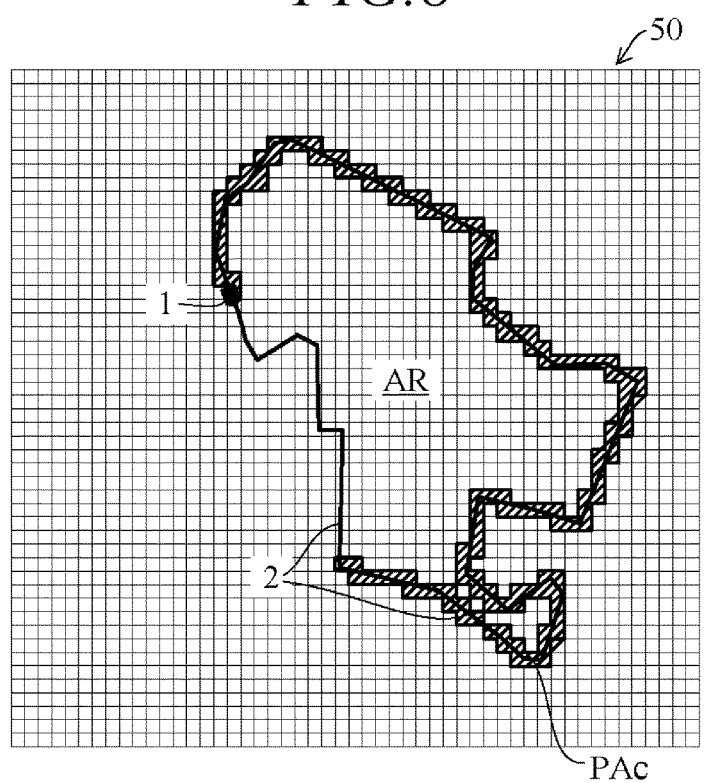
FIG. 8 is a diagram showing an example of the travel route obtained on a bitmap in trace mode by the route generating unit shown in FIG. 6.

FIG. 8 is a diagram showing an example of the travel route PAc obtained on the bitmap 50 by actually trace-driving the vehicle 1 along the boundary wire 2. FIG. 8 shows a state of the travel route PAc in the course of generation. As is clear from FIG. 8, it is confirmed that the boundary wire 2 and the travel route PAc (hatched regions) are in good agreement and a good travel route PAc defining a boundary can be obtained by driving the vehicle 1 along the boundary wire 2 in the manner of the present embodiment.

The memory unit 314 memorizes or stores the magnetic field strengths H detected from the output of the magnetic sensor (e.g., 40L) inside the boundary in trace mode in association with the travel route PA. Particularly when the travel route PA is memorized in cell units as in the present embodiment, the memory unit 314 memorizes not only the travel route data for distinguishing the travel route PAc but also the magnetic field strengths H as attribute data of the cells 51a on the bit map 50 containing the travel route PAc.

Alternatively, the magnetic field strengths H detected from the output of the magnetic sensor 40L can be memorized not in association with the cells 51a that have become the travel route PAc but with cells 51 inward thereof. For example, when the cell size is smaller than the distance d0 between the magnetic sensors 40L and 40R, it may happen that the magnetic sensor 40L is not present on a cell 51a constituting the travel route PAc. In such a case, it suffices for the memory unit 314 to memorize as attribute data the magnetic field strength H of the cell 51 inward of the cell 51a constituting the travel route PAc.

In work mode, the position identifying unit 315 identifies the position of the vehicle 1 based on a result of comparing magnetic field strength H memorized beforehand in the memory unit 314 (hereinafter called memorized magnetic field strength Ha) and magnetic field strength H detected from the outputs of the pair of magnetic sensors 40L and 40R (hereinafter called detected magnetic field strength Hb).

More specifically, when the vehicle 1 traveling in the working area AR arrives at the cell 51a on the boundary wire 2, at least one of the magnetic sensors 40L and 40R detects a magnetic field strength H exactly or nearly the same as a memorized magnetic field strength Ha. Therefore, once the position identifying unit 315 has determined the approximate position of the vehicle 1 in the working area AR based on the outputs of the angular velocity sensor 32 and wheel speed sensors 37, it searches among the memorized magnetic field strengths Ha near that position for one matching the detected magnetic field strength Hb.

Particularly in the present embodiment, the position identifying unit 315 memorizes the magnetic field strengths H in association with the cells 51 (51a) on the bitmap 50, i.e., as attribute data of the cells 51. Therefore, the position identifying unit 315 compares the memorized magnetic field strengths Ha with the detected magnetic field strengths Hb of the individual cells 51a, searches for the cells 51a where the two match, and identifies positions of the vehicle 1 from the position data of the cells 51a.

As a result, the position of the vehicle 1 can be accurately identified even in cases where slopes, ruts and the like in the working area AR lead to mismatching between the position of the vehicle 1 identified based on the outputs of the angular velocity sensor 32 and wheel speed sensors 37 and the actual position of the vehicle 1.

In areas with little variance in the memorized magnetic field strength Ha, e.g., in adjacent cells 51a whose memorized magnetic field strengths H hardly differ, it is apt to be impossible to identify the position of the vehicle 1 accurately only by comparing detected magnetic field strengths Hb with the memorized magnetic field strengths Ha of individual cells 51a.

In such a case, it is possible for the travel controlling unit 312 to control operation of the travel motors 18 to make the vehicle 1 temporarily travel (trace-drives) along part of the travel route PA in work mode to obtain detected magnetic field strengths of multiple points and for the position identifying unit 315 to identify the position of the vehicle 1 based on a result of comparing multiple detected magnetic field strengths Hb and memorized magnetic field strengths Ha.

For example, the position identifying unit 315 can identify the position of the vehicle 1 by determining whether the multiple detected magnetic field strengths Hb and the multiple memorized magnetic field strengths Ha match. The accuracy of vehicle 1 position detection can be enhanced by comparing the memorized magnetic field strengths Ha with the memorized magnetic field strengths Ha in this manner. It is also possible for the position identifying unit 315 to identify the position of the vehicle 1 not by determining whether the detected magnetic field strength Hb and memorized magnetic field strength Ha match but instead by determining whether the detected magnetic field strength Hb and memorized magnetic field strengths Ha have a predetermined correlation, e.g., whether the product of the detected magnetic field strength Hb and a predetermined coefficient matches the memorized magnetic field strength Ha.

The work-completed area identifying unit 316 identifies the work-completed area serviced by the vehicle 1, i.e., the area through which the vehicle 1 has passed in work mode (work-completed area), based on the position of the vehicle 1 identified by the position identifying unit 315.

For example, as the travel controlling unit 312 repeatedly drives the vehicle 1 back and forth in a predetermined direction within the working area in work mode, it positionally shifts the vehicle 1 by a predetermined pitch increment every time the vehicle 1 arrives at the boundary (travel route PA) (this being called parallel driving), or it drives the vehicle 1 randomly within the working area by arbitrarily changing the direction of the vehicle 1 every time it arrives at the boundary (this being called random driving).

In such cases, the position identifying unit 315 identifies the position of the vehicle 1 by comparing memorized magnetic field strength Ha with the detected magnetic field strength Hb every time the vehicle 1 approaches the boundary. The work-completed area identifying unit 316 identifies a work-completed travel route of the vehicle 1 within the working area based on outputs of the angular velocity sensor 32 and wheel speed sensors 37, as well as utility vehicle position data identified by the position identifying unit 315. In the present embodiment, this work-completed travel route is identified in cell units, and the work-completed data are memorized as attribute data of the cells 51 on the work-completed travel route for distinguishing between the work-completed area and unworked area. As a result, the work-completed area on the bitmap 50 can be identified in cell units.

Figure 9:
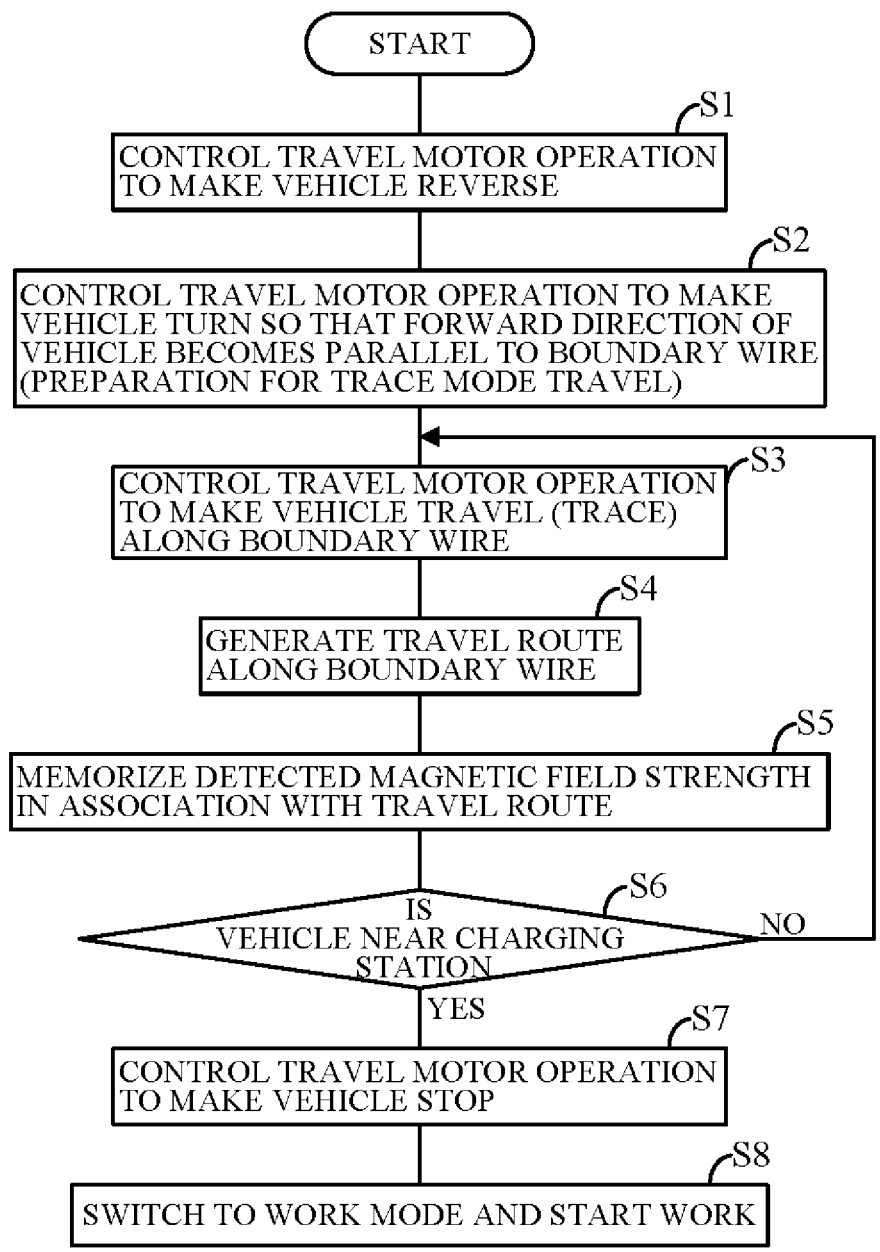
FIG. 9 is a flowchart showing an example of processing executed by the ECU shown in FIG. 5.

FIG. 9 is a flowchart showing an example of processing, particularly trace mode processing, executed in the ECU 31. The processing shown in this flowchart is started, for example, when the operator turns ON one of the operation switches 25 (main switch 26) with the vehicle 1 connected to the charging station 3.

In S1, as processing by the travel controlling unit 312, operation of the travel motors 18 is controlled to make the vehicle 1 reverse (backwards) (S: processing Step). As a result, the vehicle 1 departs from the charging station 3.

Next, the program goes to S2, in which, as processing by the travel controlling unit 312, operation of the travel motors 18 is controlled to make the vehicle 1 turn so that the forward direction of the vehicle 1 becomes parallel to the boundary wire 2 while positioning one of the magnetic sensors (e.g., 40L) inside the boundary wire 2 and the other magnetic sensor (e.g., 40R) over the boundary wire 2. This is in preparation for trace mode travel.

Next, the program goes to S3, in which, as processing by the travel controlling unit 312, operation of the travel motors 18 are controlled to make the vehicle 1 travel (trace) along the boundary wire 2 in accordance with the output of the magnetic sensor 40R so that the magnetic field strength H detected by the magnetic sensor 40R stays at zero.

Next, the program goes to S4, in which, as processing by the route generating unit 313, a travel route PA along the boundary of the working area AR is generated based on the turning angle θ of the vehicle 1 detected from the output of the angular velocity sensor 32 and the travel distance L detected from the outputs of the wheel speed sensors 37. More specifically, a travel route PAc is generated on the bitmap 50 in cell units, and the position of the travel route PAc (boundary) is identified using position data of the cells 51a containing the travel route PAc.

Next, the program goes to S5, in which, as processing by the memory unit 314, the magnetic field strength H detected from the output of the magnetic sensor 40L positioned inside the boundary is memorized in memory (RAM) in association with the travel route PA. More specifically, the magnetic field strength H is memorized together with travel route data as attribute data of the cells 51a of the bitmap 50 that contain the travel route PAc.

Next, the program goes to S6, in which, it is determined whether the vehicle 1 is near the charging station 3, i.e., whether the vehicle 1 has completed a full circuit of travel along the boundary wire 2. This determination is performed by, for example, applying electric current to the charging station 3 and using the magnetic sensors 40L and 40R to detect a distinct and specific magnetic field generated therearound by the applied current. When the result in S6 is NO, the program returns to S3 and the same processing is repeated until the result in S6 is YES.

On the other hand, when the result in S6 is YES, the program goes to S7, in which, operation of the travel motors 18 is controlled to make the vehicle 1 stop as processing by the travel controlling unit 312. The generation of the travel route PA (PAc) by processing in the route generating unit 313 is completed at this time.

Next, the program goes to S8, in which, as processing by the mode switching unit 311, trace mode is switched to work mode and work is started in the working area AR inside the travel route PAc (boundary). Alternatively, it is possible after the vehicle 1 is stopped in S7 to connect the vehicle 1 to the charging station 3 and charge the battery 20 before commencing work.

In work mode, as processing by the travel controlling unit 312, lawn mowing is performed by parallel driving or random driving of the vehicle 1, while the work unit 16 is concomitantly driven by the work motor 17. In work mode, as processing by the work-completed area identifying unit 316, the work-completed area is identified by detecting the position of the vehicle 1 based on the outputs of the angular velocity sensor 32 and wheel speed sensors 37, and the travel activity of the vehicle 1 is controlled so that the vehicle 1 travels preferentially in the unworked area rather than in the work-completed area. This enables efficient lawn mowing in the working area AR.

As processing by the position identifying unit 315, when the vehicle 1 approaches the travel route PAc (boundary) in work mode, detected magnetic field strength Hb and memorized magnetic field strength Ha are compared and the position of the vehicle 1 is identified based on the result of the comparison. This enables accurate identification (detection) of the position (self-position) of the vehicle 1. The vehicle 1 can therefore be driven thoroughly throughout the entire area, thereby ensuring that no spots are left unmowed during lawn mowing. Moreover, in the case of returning the vehicle 1 to the charging station 3, the vehicle 1 can be returned to the charging station 3 selecting an unworked area, thereby enabling an efficient return to the charging station 3.

Figure 10:
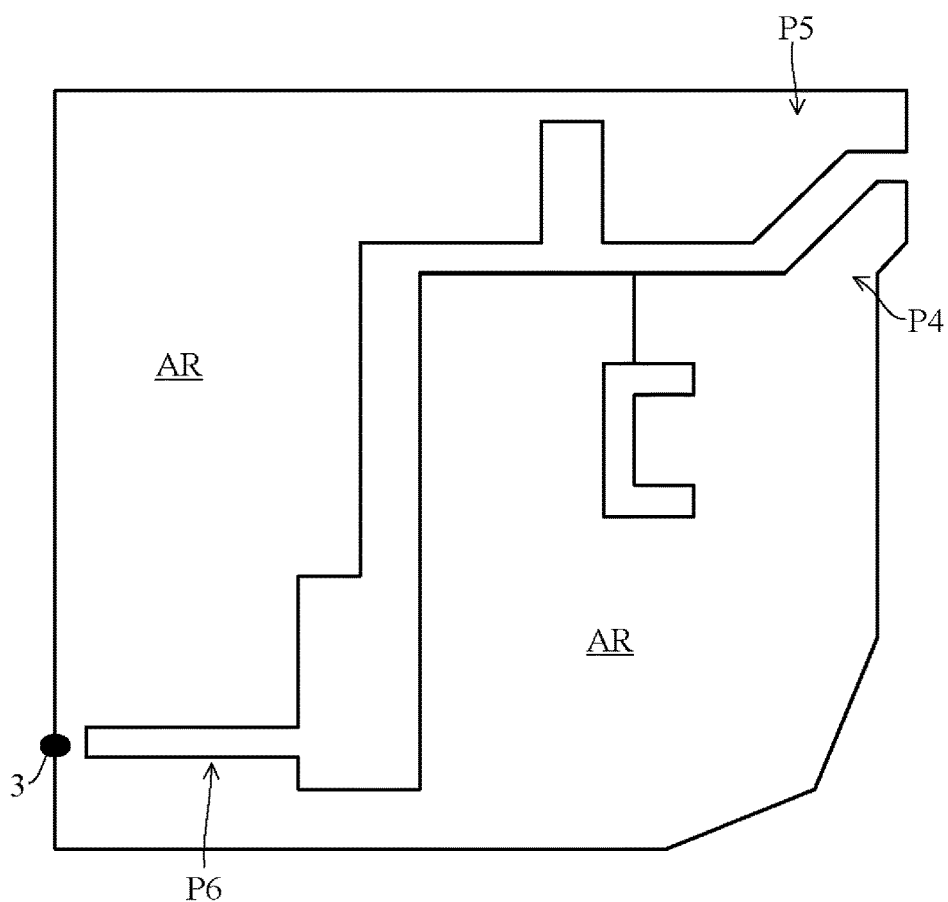
FIG. 10 is a diagram showing an arrangement of the boundary wire along which the utility vehicle is driven to trace in trace mode according to the embodiment of this invention.
Figure 11:
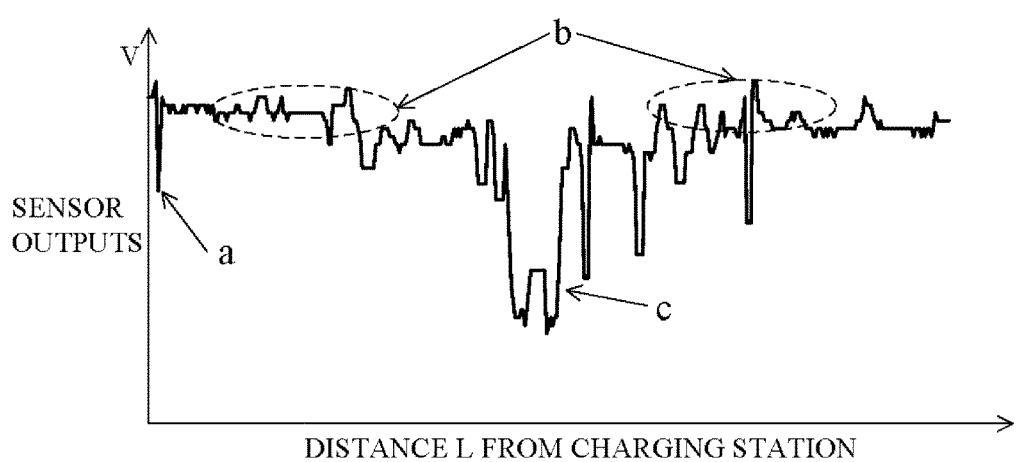
FIG. 11 is a diagram showing output of a magnetic sensor obtained by driving the utility vehicle along the boundary wire shown in FIG. 10.

In order to verify the effect of the present embodiment, the vehicle 1 was actually driven in a circuit along the boundary wire 2 shown in FIG. 10, and the output (voltage V) of the magnetic sensor (e.g., 40L) on the inside of the boundary wire 2 at this time was measured. The results are shown in FIG. 11. The vehicle 1 started to travel from the charging station 3, and in FIG. 11 the horizontal axis is scaled for distance L from the charging station 3. As seen in FIG. 11, the output of the magnetic sensor 40L varied with distance (L) from the charging station 3 in a manner including peak values.

At the start, as a special case, the vehicle 1 drove reverse and turned (S1 and S2), so that the magnetic field strength output V of the magnetic sensor 40L fell immediately after the start. (a in FIG. 11). Following this, at regions where the vehicle 1 wrapped the interior of the working area AR (P4 and P5 in FIG. 10), the output of the magnetic sensor 40 increased (b in FIG. 11), and at a region where the vehicle 1 wrapped the exterior of the working area AR (P6 in FIG. 10), the output of the magnetic sensor 40 decreased (c in FIG. 11). Thus the output of the magnetic sensor 40L varied with the layout of the boundary wire 2 in the vicinity of the vehicle 1. Therefore, by memorizing the outputs of the magnetic sensor 40L in FIG. 11 in memory beforehand and comparing them with the outputs of the magnetic sensors 40L and 40R in work mode, it was possible to accurately identify the position of the vehicle 1.

As stated above, the present embodiment is configured to have an apparatus and method for controlling operation of an autonomously navigating turnable utility vehicle (1) equipped with a body (10) and a prime mover (18) mounted on the body to make the vehicle travel about a working area (AR) delineated by a boundary wire (2) in order to work autonomously in work mode, comprising: a pair of magnetic sensors (40L, 40R) installed spaced apart from each other in a lateral direction of the body on the body of the vehicle, each of the pair of magnetic sensors detecting (producing an output indicating) a magnetic field strength (H) generated by electric current passing through the boundary wire; a turning angle detector (32) configured to detect (produce an output indicating) a turning angle (θ) of the vehicle; a travel distance detector (37) configured to detect (produce an output indicating) a travel distance (L) of the vehicle; a travel controlling unit (312) configured to control the prime mover to make the vehicle travel along the boundary wire in trace mode to be executed before the work mode, based on the magnetic field strength detected by one of the magnetic sensors while positioning other of the magnetic sensors inside the boundary wire (S3); a route generating unit (313) configured to generate a travel route (PA) along a boundary of the working area, based on the turning angle detected by the turning angle detector and the travel distance detected by the travel distance detector in the trace mode (S4); a memory unit (314) configured to memorize the magnetic field strengths detected by the other of the magnetic sensor in the trace mode in association with the travel route (S5); and a position identifying unit (315) configured to identify a position of the vehicle in the work mode by comparing the magnetic field strengths (Hb) detected by the pair of magnetic sensors with the magnetic field strengths (Ha) memorized in the memory unit (S8).

With this, taking into account that the magnetic field strength H inside the boundary wire 2 varies not only with distance from the boundary wire 2 but also with the layout of the boundary wire 2 in the vicinity of the vehicle 1, the present embodiment identifies the position of the vehicle 1 based on the result of comparing the detected magnetic field strength Hb and the memorized magnetic field strength Ha. By this it becomes possible to detect the position of the vehicle 1 accurately without using a position detection sensor such as a geomagnetic field sensor or GPS (position) sensor. Moreover, the fact that no position sensor is required makes it possible to build the control apparatus as a whole at low cost. And as the frame structure need not be redesigned to accommodate a position sensor, application to an existing configuration is easy.

In the apparatus and method, the route generating unit is configured to generate the travel route on a bitmap (50) composed of an array of multiple cells (51), each of the cells having position data, the memory unit is configured to memorize the magnetic field strengths in association with the cells (51a) on the bitmap corresponding to the travel route (PAc), and the position identifying unit is configured to identify the position of the vehicle based on the position data of the cells on the bitmap.

With this, in addition to the advantages and effects mentioned above, when the position of the vehicle 1 is identified in cell units using the bitmap 50 in this manner, data processing is easy because it suffices to memorize the outputs of the magnetic sensors 40L as attribute data of the cells 51. Further, since the ensuing work is also performed in cell units, it is also easy to differentiate unworked areas while in work mode.

The apparatus and method further comprises: a work-completed area identifying unit (316) configured to identify a work-completed area worked by the vehicle, based on the position of the vehicle identified by the position identifying unit (S8).

With this, in addition to the advantages and effects mentioned above, unworked areas within the working area AR can be accurately determined to enable work to be efficiently carried out throughout the working area AR.

In the apparatus and method, the travel controlling unit is configured to control the prime mover to make the vehicle travel temporarily along a part of the travel route in the work mode, and the position identifying unit is configured to identify the position of the vehicle by comparing the magnetic field strengths detected by the pair of the magnetic sensors with the magnetic field strengths memorized by the memory unit when the vehicle is made travel temporarily along the part of the travel route.

With this, in addition to the advantages and effects mentioned above, the position of the vehicle 1 can be identified still more accurately. In other words, since the plurality of continuous memorized magnetic field strengths Ha in the working area AR are compared with the detected magnetic field strengths Hb in this case, whether or not the detected magnetic field strengths Hb and memorized magnetic field strengths Ha match can be accurately determined to enable the position of the vehicle 1 to be detected with better accuracy.

In the apparatus and method, the pair of magnetic sensors are installed symmetrically with respect to a center line (CL)

of the vehicle, the center line extending in a straight forward direction of the vehicle and passing through a center in the lateral direction of the body.

With this, in addition to the advantages and effects mentioned above, the magnetic sensor 40L or 40R inside the boundary wire 2 outputs the same output as the other in the case where the vehicle 1 is driven clockwise and the case where it is driven counterclockwise along the boundary wire 2. The vehicle 1 can therefore be driven without taking the circling direction of the vehicle 1 into account.

In the apparatus and method, the travel controlling unit is configured to control the prime mover to make the vehicle travel along the boundary wire in the trace mode such that the magnetic field strength detected by the one of the magnetic sensors is kept to be zero while the magnetic field strength detected by the other of the magnetic sensors is positioned inside the boundary wire.

With this, in addition to the advantages and effects mentioned above, it becomes possible to identify the position of the vehicle 1 more accurately.

In the apparatus and method, the route generating unit is configured to generate the travel route on the bitmap in a horizontal plane containing an X-axis and a Y-axis perpendicular to each other, the respective cells on the bitmap having the position data defined with respect to a predetermined position.

With this, in addition to the advantages and effects mentioned above, when the position of the vehicle 1 is identified in cell units using the bitmap 50 in this manner, data processing becomes easier.

In the above, although the present embodiment is configured such that the mode switching unit 311 switches between work mode and trace mode, it may be configured such that the unit 311 switches between returning mode to return the vehicle 1 to the charging station 3 and other modes. Alternatively it may be configured such the mode switching is made not by the unit 311, but by operator's manipulation of the operation switch 25.

Although the present embodiment is configured such that the vehicle 1 is driven by the prime mover comprising a pair of travel motors 18L, 18R, it may be configured such that the vehicle 1 can be driven by other prime mover such as an internal combustion engine.

Although the present embodiment is configured such that the a pair of magnetic sensors 40L, 40R are installed laterally symmetrically with respect to the center line CL running in the straight forward direction along the widthwise center of the vehicle 1, it suffices if the sensors 40 are installed laterally at positions spaced apart from each other along the widthwise direction of the vehicle body 10.

Although the present embodiment is configured such that the turning angle of the vehicle 1 is obtained by time-integrating outputs of the angular velocity sensor 32, it may be configured such that the turning angle is directly detected. Similarly, although the travel distance is obtained by time-integrating outputs of the wheel speed sensor 37, it can be directly detected.

Although the present embodiment is configured such that the position of the vehicle 1 is detected or identified using the bitmap 50, the use of the bitmap is not necessary. It is alternatively possible to generate the travel route based on the turning angle and travel distance, to memorize the detected magnetic field strength in the trace mode in association with the generated travel route, and to identify the position of the vehicle 1 based on a result of comparison of the detected and memorized magnetic field strength in the work mode.

It should be noted in the above that, although the present embodiment is applied for a lawn mower for lawn or grass mowing work, it may applied to any other type of utility vehicle.

While the present invention has been described with reference to the preferred embodiments thereof, it will be understood, by those skilled in the art, that various changes and modifications may be made thereto without departing from the scope of the appended claims.

What is claimed is:

1. An apparatus for controlling operation of an autonomously navigating turnable utility vehicle equipped with a body and a prime mover mounted on the body to make the vehicle travel about a working area delineated by a boundary wire in order to work autonomously in work mode, comprising:
    a pair of magnetic sensors installed spaced apart from each other in a lateral direction of the body on the body of the vehicle, each of the pair of magnetic sensors detecting a magnetic field strength generated by electric current passing through the boundary wire;
    a turning angle detector configured to detect a turning angle of the vehicle;
    a travel distance detector configured to detect a travel distance of the vehicle;
    a travel controlling unit configured to control the prime mover to make the vehicle travel along the boundary wire in trace mode to be executed before the work mode such that the magnetic field strength detected by one of the magnetic sensors is kept to be zero while positioning other of the magnetic sensors inside the boundary wire;
    a route generating unit configured to generate a travel route along a boundary of the working area, based on the turning angle detected by the turning angle detector and the travel distance detected by the travel distance detector in the trace mode;
    a memory unit configured to memorize the magnetic field strengths detected by the other of the magnetic sensors in the trace mode in association with the travel route; and
    a position identifying unit configured to identify a position of the vehicle along the travel route in the work mode by comparing the magnetic field strength detected by at least one of the pair of magnetic sensors with the magnetic field strengths memorized in the memory unit.

2. The apparatus according to claim 1, wherein the route generating unit is configured to generate the travel route on a bitmap composed of an array of multiple cells, each of the cells having position data,
    the memory unit is configured to memorize the magnetic field strengths in association with the cells on the bitmap corresponding to the travel route, and
    the position identifying unit is configured to identify the position of the vehicle based on the position data of the cells on the bitmap.

3. The apparatus according to claim 1, further comprising, a work-completed area identifying unit configured to identify a work-completed area worked by the vehicle, based on the position of the vehicle identified by the position identifying unit.

4. The apparatus according to claim 2, further comprising, a work-completed area identifying unit configured to identify a work-completed area worked by the vehicle, based on the position of the vehicle identified by the position identifying unit.

5. The apparatus according to claim 1, wherein the travel controlling unit is configured to control the prime mover to make the vehicle travel temporarily along a part of the travel route in the work mode, and the position identifying unit is configured to identify the position of the vehicle by comparing the magnetic field strength detected by the at least one of the pair of the magnetic sensors with the magnetic field strengths memorized by the memory unit when the vehicle is made to travel temporarily along the part of the travel route.

6. The apparatus according to claim 4, wherein the travel controlling unit is configured to control the prime mover to make the vehicle travel temporarily along a part of the travel route in the work mode, and the position identifying unit is configured to identify the position of the vehicle by comparing the magnetic field strength detected by the at least one of the pair of the magnetic sensors with the magnetic field strengths memorized by the memory unit when the vehicle is made to travel temporarily along the part of the travel route.

7. The apparatus according to claim 1, wherein the pair of magnetic sensors are installed symmetrically with respect to a center line of the vehicle, the center line extending in a straight forward direction of the vehicle and passing through a center in the lateral direction of the body.

8. The apparatus according to claim 2, wherein the route generating unit is configured to generate the travel route on the bitmap in a horizontal plane containing an X-axis and a Y-axis perpendicular to each other, the respective cells on the bitmap having the position data defined with respect to a predetermined position.

9. A method for controlling operation of an autonomously navigating turnable utility vehicle equipped with a body and a prime mover mounted on the body to make the vehicle travel about a working area delineated by a boundary wire in order to work autonomously in work mode, the vehicle including a pair of magnetic sensors installed spaced apart from each other in a lateral direction of the body on the body of the vehicle, each of the pair of magnetic sensors detecting a magnetic field strength generated by electric current passing through the boundary wire, comprising the steps of:

detecting a turning angle of the vehicle;

detecting a travel distance of the vehicle;

controlling the prime mover to make the vehicle travel along the boundary wire in trace mode to be executed before the work mode such that the magnetic field strength detected by one of the magnetic sensors is kept to be zero while positioning other of the magnetic sensors inside the boundary wire;

generating a travel route along a boundary of the working area, based on the turning angle detected in the step of detecting the turning angle and the travel distance detected in the step of detecting the travel distance in the trace mode;

memorizing the magnetic field strengths detected by the other of the magnetic sensors in the trace mode in association with the travel route; and identifying a position of the vehicle along the travel route in the work mode by comparing the magnetic field strength detected by at least one of the pair of magnetic sensors with the magnetic field strengths memorized in the memory unit.

10. The method according to claim 9, wherein the step of generating includes generating the travel route on a bitmap composed of an array of multiple cells, each of the cells having position data, the step of memorizing includes memorizing the magnetic field strengths in association with the cells on the bitmap corresponding to the travel route, and the step of identifying includes identifying the position of the vehicle based on the position data of the cells on the bitmap.

11. The method according to claim 9, further comprising the step of identifying a work-completed area worked by the vehicle, based on the position of the vehicle identified in the step of identifying the position.

12. The method according to claim 10, further comprising the step of identifying a work-completed area worked by the vehicle, based on the position of the vehicle identified in the step of identifying the position.

13. The method according to claim 9, wherein the step of controlling includes controlling the prime mover to make the vehicle travel temporarily along a part of the travel route in the work mode, and the step of identifying includes identifying the position of the vehicle by comparing the magnetic field strength detected by the at least one of the pair of the magnetic sensors with the magnetic field strengths memorized in the step of memorizing when the vehicle is made to travel temporarily along the part of the travel route.

14. The method according to claim 12, wherein the step of controlling includes controlling the prime mover to make the vehicle travel temporarily along a part of the travel route in the work mode, and the step of identifying the position includes identifying the position of the vehicle by comparing the magnetic field strength detected by the at least one of the pair of the magnetic sensors with the magnetic field strengths memorized in the step of memorizing when the vehicle is made to travel temporarily along the part of the travel route.

15. The method according to claim 9, wherein the pair of magnetic sensors are installed symmetrically with respect to a center line of the vehicle, the center line extending in a straight forward direction of the vehicle and passing through a center in the lateral direction of the body.

16. The method according to claim 10, wherein the step of generating includes generating the travel route on the bitmap in a horizontal plane containing an X-axis and a Y-axis perpendicular to each other, the respective cells on the bitmap having the position data defined with respect to a predetermined position.

* * * * *